United States Patent
Vossberg

(10) Patent No.: US 7,086,438 B1
(45) Date of Patent: Aug. 8, 2006

(54) PNEUMATIC TIRE HAVING A STABILIZING SYSTEM FOR UNDER-INFLATED CONDITIONS

(76) Inventor: Stephen M. Vossberg, 3627 Longwood Dr., Medina, OH (US) 44256

( * ) Notice: Subject to any disclaimer, the term of this patent is extended or adjusted under 35 U.S.C. 154(b) by 1213 days.

(21) Appl. No.: 09/651,786

(22) Filed: Aug. 30, 2000

(51) Int. Cl.
*B60C 3/00* (2006.01)
*B60C 17/00* (2006.01)
*B60C 17/10* (2006.01)

(52) U.S. Cl. ............... 152/165; 152/454; 152/516; 152/521

(58) Field of Classification Search .......... 152/165, 152/454, 513, 516, 521, 522, 157, 158, 450, 152/510, 523, 520, 511, 512, 501
See application file for complete search history.

(56) References Cited

U.S. PATENT DOCUMENTS

| | | | | |
|---|---|---|---|---|
| 730,474 A | * | 6/1903 | Rayner | 152/157 |
| 1,836,091 A | * | 12/1931 | Shoemaker | 152/523 X |
| 2,021,500 A | * | 11/1935 | De Vita | 152/158 |
| 3,288,193 A | | 11/1966 | Mantzel | |
| 3,367,381 A | * | 2/1968 | Aghnides | 152/158 |
| 3,610,308 A | | 10/1971 | McDonald | |
| 3,734,157 A | | 5/1973 | Roque | |
| 3,913,654 A | | 10/1975 | French | |
| 4,157,107 A | * | 6/1979 | Cataldo | 152/520 |
| 4,341,249 A | * | 7/1982 | Welter | 152/516 |
| 4,405,007 A | | 9/1983 | Welter | |
| 4,467,852 A | | 8/1984 | Ippen et al. | |
| 4,676,288 A | | 6/1987 | Zinnen | |
| 4,722,377 A | | 2/1988 | Dobson | |
| 5,499,669 A | | 3/1996 | Hardesty | |
| 5,891,279 A | | 4/1999 | Lacour | |
| 6,044,884 A | | 4/2000 | Peda | |
| 6,186,206 B1 | * | 2/2001 | Yamagiwa et al. | 152/520 |

FOREIGN PATENT DOCUMENTS

| | | | | |
|---|---|---|---|---|
| DE | 1 015 706 | * | 9/1957 | 152/520 |
| DE | 24 32 927 A1 | * | 1/1976 | 152/520 |
| DE | 25 26 758 A1 | * | 12/1976 | 152/520 |
| DE | 25 28 218 A1 | * | 1/1977 | 152/520 |
| GB | 1426914 A | | 3/1976 | |
| GB | 1547895 A | | 6/1979 | |

* cited by examiner

*Primary Examiner*—Adrienne C. Johnstone

(57) ABSTRACT

A stabilizing system for a pneumatic tire and wheel assembly includes complimentary projections and grooves on internal regions of the tire which contact each during an under-inflated condition. The projections and grooves mate with each other during the under-inflated condition to provide mechanical and positive interconnection between the regions in a direction of travel thereby inhibiting lateral movement between the tire and the rim.

16 Claims, 1 Drawing Sheet

PNEUMATIC TIRE HAVING A STABILIZING SYSTEM FOR UNDER-INFLATED CONDITIONS

FIELD OF THE INVENTION

The present invention relates to a pneumatic tire having a stabilizing system for improving run flat characteristics during under-inflated conditions.

BACKGROUND OF THE INVENTION

A tire and wheel assembly commonly comprises a rim and a pneumatic tire mounted to the rim. The pneumatic tire typically includes a ground-supporting portion and a pair of sidewall portions which define an inflation chamber. If, for example, the inflation chamber is free from intermediate supporting structure, regions of the sidewall portions will collapse into each other when the tire becomes deflated or in an otherwise under-inflated condition. This will result in internal tread-adjacent regions contacting internal rim-adjacent regions during an under-inflated condition. The tread-adjacent region is usually just radially inward of the tire's tread edge and the rim-adjacent region is usually just radially outward of the rim.

In the event of an under-inflated condition, commonly called in the extreme a "flat tire", it is usually necessary to drive the vehicle for at least a limited distance to remove the vehicle from the flow of traffic and/or to transport the vehicle to a repair location. During this driving period, there is the possibility of lateral movement between the deflated tire and rim. Specifically, the ground-engaging portion of the tire is not held sufficiently rigid and "wobbles" during the flat tire driving period and the deflated tire actually rides on its collapsed sidewall portions. This can result in destruction of the tire and/or the vehicle moving in an uncontrolled manner out of the prescribed direction of travel under the influence of forces brought about by the under-inflated condition of the tire. In the extreme, the tire can separate from the wheel, causing the driver to attempt to operate the vehicle by driving on the metal rim, a very unsafe and damaging situation.

In the past, attempts have been made to improve the run characteristics of a tire and wheel assembly in an under-inflated condition. These attempts have included mounting stabilizing members on the rim of the wheel (see e.g., U.S. Pat. No. 3,288,193 to Mantzel and U.S. Pat. No. 4,767,288 to Zinnen), substantially increasing the thickness/stiffness of the ground-engaging or sidewall portions (see e.g., U.S. Pat. No. 3,734,157 to Roque, U.S. Pat. No. 4,405,007 to Welter, and U.S. Pat. No. 4,467,852 to Ippen), and/or providing safety supports that occupy a substantial amount of space within the inflation chamber (see e.g., U.S. Pat. No. 3,610,308 to McDonald, U.S. Pat. No. 4,722,377 to Dobson, and U.S. Pat. No. 5,891,279 to Lacour). While such techniques can improve run flat characteristics, they tend to add a significant amount of excess mass, complicate manufacturing procedures and/or require the mounting of extra structural pieces on the rim or within the tire.

SUMMARY OF THE INVENTION

The present invention provides a stabilizing system that allows a tire/wheel assembly to have improved run flat characteristics without adding unduly excessive mass, without complicating manufacturing procedures, and/or without requiring the mounting of extra structural pieces on the rim or tire.

More particularly, the present invention provides a pneumatic tire including a ground-engaging portion including a tread, a bead portion, and a pair of sidewall portions therebetween which define an inflation chamber. A stabilizing system, within the inflation chamber, includes a pair of regions which contact each other during an under-inflated condition within the inflation chamber. At least one of the regions includes projections which extend into the other region and/or the regions mate with each other during under inflation.

When the tire according to the present invention is used in a tire and wheel assembly, the portions include internal tread-adjacent regions and internal rim-adjacent regions which contact each other during an under-inflated condition. The tread-adjacent regions are located just radially inward of a tread edge of the tire and the internal rim-adjacent regions are located just radially outward of the rim. The stabilizing system preferably comprises projections on one of the internal regions and complimentary grooves on the other internal regions. The respective projections and grooves mate with each other during the under-inflated condition to provide mechanical and positive interconnection between the regions thereby inhibiting lateral movement between the tire and the rim.

The projections and grooves of the stabilizing system add only a minimal amount of mass to the tire whereby the mass of the tire is not significantly increased, a significant factor for automobile construction in terms of rolling resistance of the tire and total weight of the automobile. Also, the projections and the grooves can be formed during the curing stage of the tire-making process whereby extra steps are not added to the tire manufacturing procedure. Furthermore, the stabilizing system of the present invention does not require the mounting of any structural components on the rim and/or within any of the tire portions.

These and other features of the invention are fully described and particularly pointed out in the claims. The following descriptive annexed drawings set forth in detail certain illustrative embodiments of the invention, these embodiments being indicative of but a few of the various ways in which the principles of the invention can be employed.

DRAWINGS

DETAILED DESCRIPTION

Figure 1:
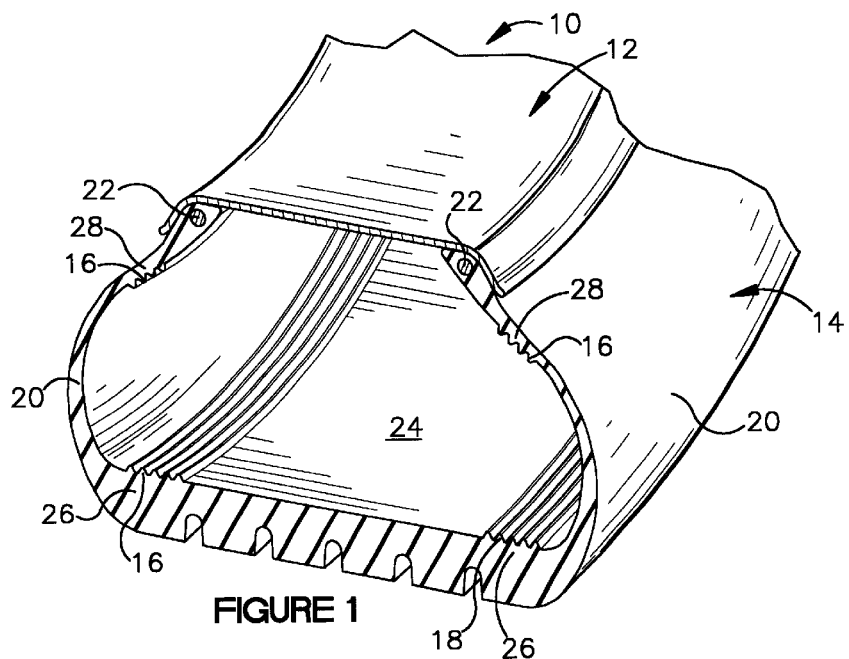
FIG. 1 is a schematic sectional perspective view of a tire and wheel assembly in a normal inflated condition.

Referring now to the drawings in detail, and initially to FIG. 1, a tire and wheel assembly 10 according to the present invention is shown. The tire and wheel assembly 10 comprises a rim 12 and pneumatic tire 14 mounted on the rim 12. A stabilizing system 16 is incorporated into the assembly 10, and particularly the tire 14, to provide the tire/wheel assembly 10 with improved run flat characteristics. As is explained in more detail below, this improvement is accomplished without adding unduly excessive mass, without significantly complicating manufacturing procedures, and/or without requiring the mounting of extra structural pieces on the rim 12 or tire 14.

Figure 2:
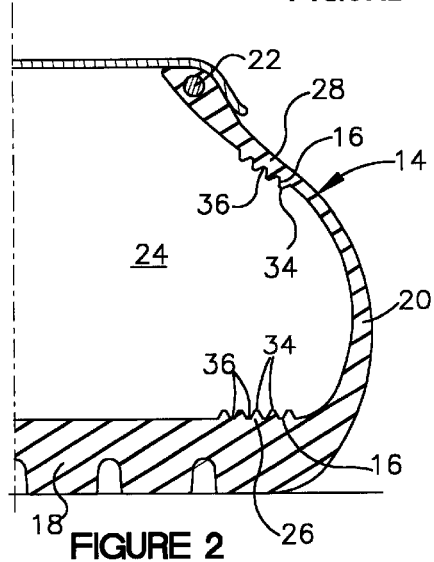
FIG. 2 is a schematic sectional view of a part of the tire in the normal inflated condition.
Figure 3:
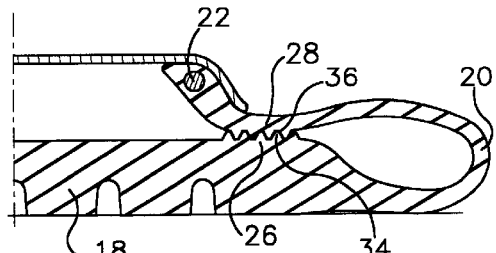
FIG. 3 is a schematic sectional view of this part of the tire in an under-deflated condition.

The tire 14 comprises a ground-engaging portion 18 and a pair of sidewall portions 20 that terminate in a pair of bead portions 22. The portions 18 and 20 define an inflation chamber 24 which, in the illustrated embodiment, is free from intermediate supporting structure. The portions can each be viewed as including internal tread-adjacent regions 26 and internal rim-adjacent regions 28. The tread-adjacent region 26 is just laterally inward of the tire's tread edge and the rim-adjacent region 28 is just laterally outward of the rim 12. In the normal inflated condition shown in FIG. 2, the internal tread-adjacent regions 26 are radially separated from the internal rim-adjacent regions 28. In the under-inflated condition shown in FIG. 3, the tread-adjacent regions 26 contact the rim-adjacent regions 28.

Figure 4:
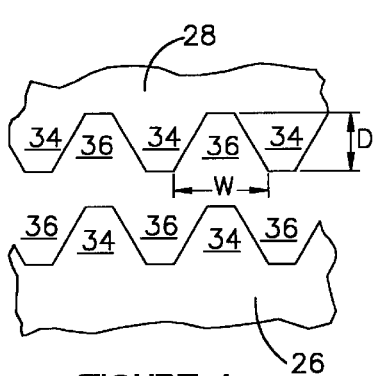
FIG. 4 is an enlarged view of projections and grooves formed in certain regions of the tire.

As is best seen in FIG. 4, the stabilizing system 16 comprises projections 34 and complimentary grooves 36 on the internal regions 26 and 28. During the under-inflated condition, the projections 34 and the grooves 36 mate to provide mechanical and positive interconnection between the regions 26 and 28 in a direction of travel. This decreases the possibility of lateral movement between the rim 12 and the deflated tire 14 allowing the vehicle to move in a controlled manner in the prescribed direction of travel. The projections 34 and the grooves 36 can be formed on the internal regions 26 and 28 of the tire 14 during the curing stage of the tire-making process.

Figure 5:
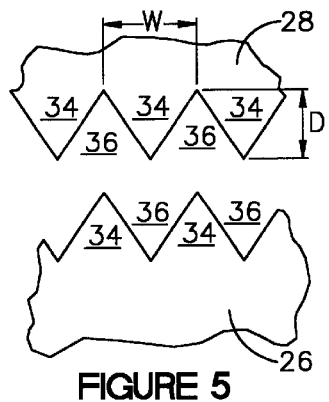
FIG. 5 is an enlarged view of a modified form of the projections and grooves.
Figure 6:
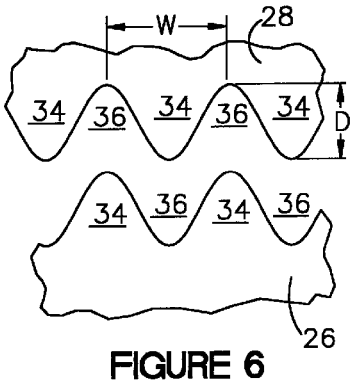
FIG. 6 is an enlarged view of another modified form of the projections and grooves.

In the illustrated embodiment, the stabilizing system 16 comprises a corrugation system wherein each of the internal surfaces 30 and 32 includes both projections 34 and grooves 36. In the embodiment illustrated in FIG. 4, the projections 34 and grooves 36 are oriented in the circumferential direction and, when viewed in cross-section, have a tooth-liked configuration with a trapezoidal shape. In the embodiment illustrated in FIG. 5, the projections 34 and grooves 36 are oriented in the circumferential direction and, when viewed in cross-section, have a tooth-liked configuration with a triangular shape. In the embodiment illustrated in FIG. 6, the projection 34 and groove 36 are oriented in the circumferential direction and, when viewed in cross-section, have a wave-like configuration whereby the projections 34 are hills and the grooves 36 are valleys.

The width W and depth D of the projections 34 and the grooves 36 is selected so that a reliable interconnection is formed between the relevant regions of the tire 14. For example, the width W of the projections 34 and grooves 36 can be between 1 mm and 6 mm, can be between 2 mm and 5 mm, or can be between 3 mm and 4 mm. The depth D of the projections 34 and the grooves 36 can be between 0.5 mm and 2 mm, can be between 0.75 mm and 1.75 mm, or can be between 1.0 mm and 1.5 mm. As shown in the drawings, the depth is measured from the unimproved sidewall surface.

The corrugation (i.e., the projections 34 and the grooves 36) can instead extend in a direction transverse to the circumferential direction, in a direction inclined to the circumferential direction, or in several directions such as a diagonal network of grooves. Additionally or alternatively, the geometry of the corrugation can be of much smaller dimensions that allows the contact surfaces to rapidly mesh with one another, yet to also disengage and again with one another when high tension forces are transmitted. Moreover, the stabilizing system 16 need not be a corrugation system in that one region (e.g., either the tread-adjacent region 26 or the rim-adjacent region 28) can include only projections 34 and the other region can include only complimentary grooves 36.

Prolonged use of the tire 14 in the under-inflated condition can be enhanced by providing a lubricant within the tire cavity or inflation chamber 24. The lubricant can be present in the tire cavity during normal inflated operating conditions or can be dispensed in the tire cavity when the tire goes to the under-inflated condition. The amount of lubricant necessary will depend upon the size of the tire and the physical properties of the particular lubricant being used. Suitable lubricants include liquid lubricants, such as oils or water dispersions containing solids, and/or solid lubricants, such as balls or powders.

One can now appreciate that the present invention provides a stabilizing system 16 that allows a tire/wheel assembly 10 to have improved run flat characteristics without adding unduly excessive mass, without significantly complicating manufacturing costs procedures, and/or without requiring the mounting of extra structural pieces on the rim 12 or elsewhere. Specifically, for example, because the projections 34 and the grooves 36 add only a minimal amount of mass to the tire 14, the total mass of the tire is not significantly changed. Also because the projections 34 and the grooves 36 can be formed during the curing stage of the tire-making process, manufacturing is not complicated. Furthermore, because the projections 34 and the grooves 36 are incorporated into the structure of the tire 14, no mounting of the structural components on the rim 12 and/or the within tire sidewall portions 20 is necessary.

Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. A pneumatic tire and wheel assembly comprising a wheel rim and a pneumatic tire mounted on the wheel rim;

the pneumatic tire comprising a ground-engaging portion and a pair of sidewall portions which define an inflation chamber, these portions including internal tread-adjacent regions which contact respective internal rim-adjacent regions during an under-inflated condition;

the pneumatic tire also comprising a stabilizing system comprising projections on one of the internal regions and complementary grooves on the other internal regions which mate with each other during the under-inflated condition to provide mechanical and positive interconnection between the regions thereby inhibiting lateral movement between the pneumatic tire and the rim.

2. A tire and wheel assembly as set forth in claim 1, wherein the internal tread-adjacent regions are located just laterally inward of a tread edge of the tire and wherein the internal rim-adjacent regions are located just laterally outward of the rim.

3. A tire and wheel assembly as set forth in claim 1, wherein the stabilizing system comprises a corrugation system wherein each of the internal surfaces includes the projections and the grooves.

4. A tire and wheel assembly as set forth in claim 3, wherein the projections and the grooves of the corrugation system are oriented in the circumferential direction.

5. A tire and wheel assembly as set forth in claim 3, wherein the width of the projections and the grooves is between 1 mm and 6 mm and wherein the depth of the projections and the grooves is between 0.5 mm and 2 mm.

6. A tire and wheel assembly as set forth in claim 5, wherein the width of the projections and the grooves is between 2 mm and 5 mm and wherein the depth of the projections and the grooves is between 0.75 mm and 1.75 mm.

7. A tire and wheel assembly as set forth in claim 5, wherein the width of the projections and the grooves is between 3 mm and 4 mm and wherein the depth of the projections and the grooves is between 1.0 mm and 1.5 mm.

8. A tire and wheel assembly as set forth in claim 5, wherein the grooves and projections of the corrugation system, when viewed in cross-section, have a tooth-like configuration.

9. A tire and wheel assembly as set forth in claim 8, wherein the tooth-like configuration is trapezoidal in cross-sectional shape.

10. A tire and wheel assembly as set forth in claim 8, wherein the tooth-like configuration is triangular in cross-sectional shape.

11. A tire and wheel assembly as set forth in claim 8, wherein the corrugation system, when viewed in cross-section, has a wave-like configuration whereby the projections are hills and the grooves are valleys.

12. A tire and wheel assembly as set forth in claim 1, including a lubricant within the inflation chamber which is dispersed during the under-inflated condition.

13. A pneumatic tire, comprising:

a ground-engaging portion including a tread;

a bead portion;

a pair of sidewall portions between the ground-engaging portion and the bead portion, together which define an inflation chamber, and a stabilizing system within the inflation chamber on a sidewall portion, comprising a pair of mating portions which contact each other during an under-inflated condition within the inflation chamber.

14. A tire as set forth in claim 13, wherein the mating portions reside on the sidewall portion in opposing locations relative to a collapse of the sidewall portion during an under-inflated condition within the inflation chamber.

15. A tire as set forth in claim 14, wherein the mating portions comprise projections, grooves, or a combination of projections and grooves.

16. A pneumatic tire, comprising:

a ground-engaging portion including a tread;

a bead portion;

a pair of sidewall portions between the ground-engaging portion and the bead portion, together which define an inflation chamber, and a stabilizing system within the inflation chamber on a sidewall portion, comprising a pair of regions which contact each other during an under-inflated condition within the inflation chamber, at least one of the regions including projections which mate with grooves in the other region upon a collapse of the sidewall portion during an under-inflated condition within the inflation chamber.

* * * * *